July 6, 1943.  G. BROSCO  2,323,450
WELDING CLAMP
Filed April 16, 1942
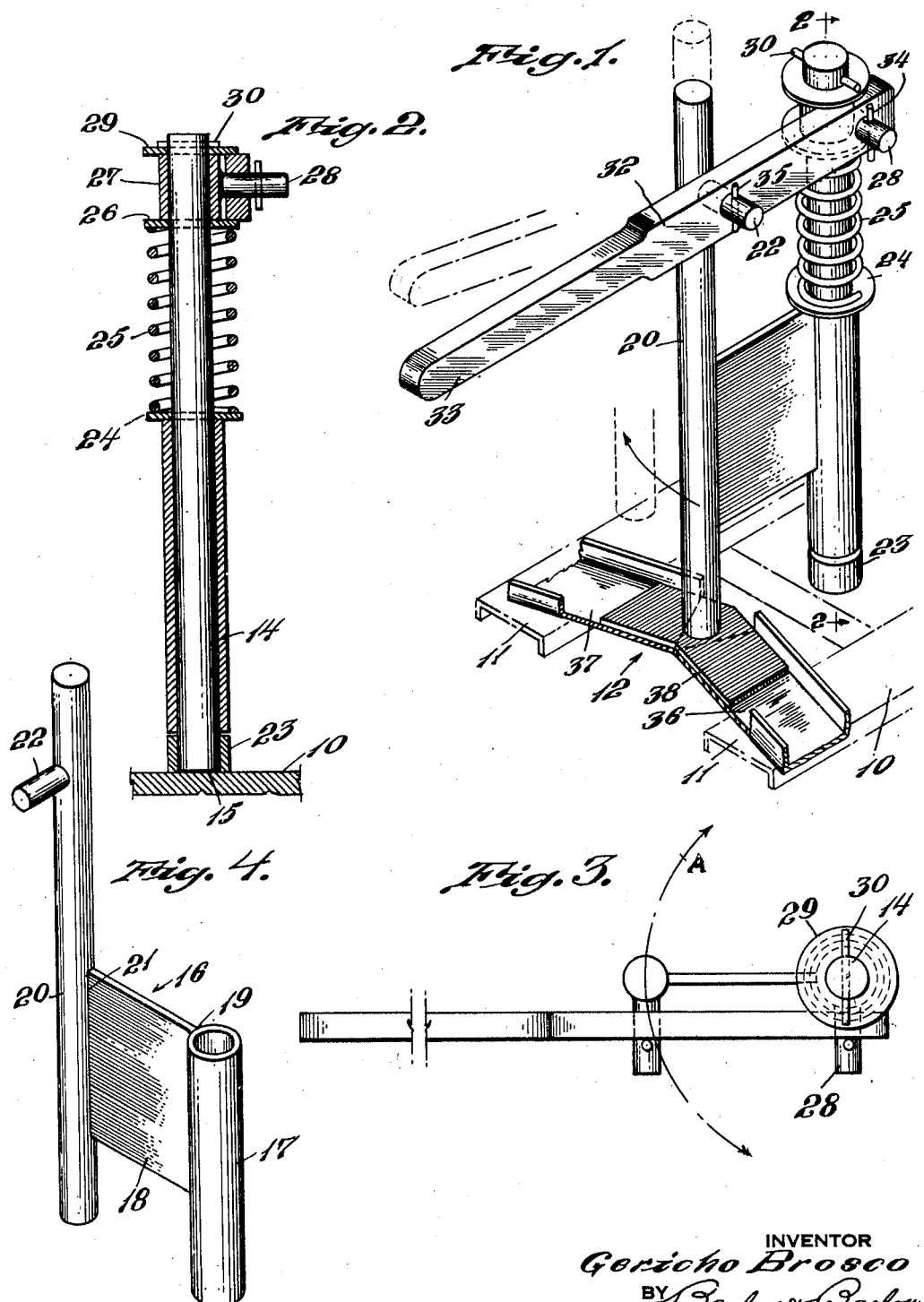
INVENTOR
Gericho Brosco
BY Barlow & Barlow
ATTORNEYS Patented July 6, 1943

2,323,450

UNITED STATES PATENT OFFICE 2,323,450

WELDING CLAMP

Gericho Brosco, Warwick, R. I., assignor of one-third to Constance B. Sargent, Boston, Mass., and one-sixth to Fred Brosco, Johnston, R. I.

Application April 16, 1942, Serial No. 439,151

4 Claims. (Cl. 29—89)

This invention relates to a clamp of the type particularly adapted for clamping together two parts which are to be welded.

Heretofore in the use of welding clamps for the purpose for which this invention is used, the rough treatment to which the clamps have been subjected cause them to be short-lived. The high heat and strain on the parts causes them to bend or curl, requiring various makeshift arrangements. In the type that require screwing up to clamp the parts in position, there is required a considerable length of time to bind the parts as desired. Further, with all these different type clamps with which I am familiar, the maintenance cost is high.

One of the objects of this invention is to improve the welding clamps in the various particulars in which the prior clamps have given some dissatisfaction as stated above.

Another object of this invention is to provide a simple clamp which may be made of parts which are easily constructed and quickly assembled.

Another object of this invention is to provide a clamp of such strong construction that it will not be easily damaged by the rough treatment to which welding clamps are usually subjected.

Another object of this invention is to provide a spring-acting clamp with the spring so arranged as to provide rugged and firm pressure on the parts of the work which are to be clamped together.

Another object of the invention is to provide for the forces acting in such direction that they will be well supported.

Another object of the invention is to provide an arrangement which may be easily manipulated by the hand of the operator.

Another object of the invention is to provide a clamp which may be readily lifted and swung out of the way when it is desired to allow the work freedom of movement in being lifted from operating position.

Another object of the invention is to provide a clamp with which the welder may follow the welding operation, or such that he may move the clamp along so as to provide suitable access to the parts to be welded.

A further object of the invention is to provide an arrangement which may act as a hammer for driving the parts of the work which are to be welded, together with a hammer action blow.

A still further object of the invention is to provide a short lift for the clamping jaw or hammer which is to engage the work.

With these and other objects in view, the invention consists of certain novel features of construction, as will be more fully described and particularly pointed out in the appended claims.

In the accompanying drawing:

Fig. 1 is a perspective view illustrating in dot-dash lines a raised position of the clamping jaw, and showing the work and mounting of the clamp in their relative position.

Fig. 2 is a sectional view on substantially line 2—2 of Fig. 1;

Fig. 3 is a top plan view of the clamp as shown in Fig. 1; and

Fig. 4 is a perspective view illustrating a unit bracket mounting as removed from the post.

In proceeding with this invention, I provide a rigid supporting post suitably mounted rigidly upon some jig designed specifically for the work which is in hand. On this post I mount a sleeve or some part which will permit swiveling, and then support from this sleeve or swivel a member which is to act as a clamping jaw. This is supported through an arm from the sleeve a sufficient distance so that this jaw may be swung from a position in engagement with the work to a position clear of the work to permit removal of the work from some suitable support. A spring is provided forcing the sleeve which carries the jaw downwardly while a suitable leverage for manipulation may be provided to lift this jaw member from engagement with the work, the arrangement being such that at the same time that the member is lifted, it may be swung or swiveled, and for this purpose I provide a collar having a mounting stud which will rock about this rigid post as a center.

With reference to the drawing, 10 designates a portion of the jig shown in dot-dash lines in Fig. 1 which is suitably constructed with supporting arms 11 for the work designated generally 12, the jig in this particular case being arranged for suitably supporting a channel iron to which a plate is to be welded.

The post 14 of my improved clamp is welded as at 15 to the portion of the jig 10 upon which it is to be mounted, and extends upwardly therefrom, substantially vertically. The unit shown in perspective in Fig. 4 and designated generally 16 is the activated part of my clamp, and consists of a sleeve 17 of a size to slidably and rotatably fit the post 14 with the web-like arm 18 extending laterally of the axis of this sleeve and welded to the sleeve as at 19 while at the outer end of the arm the jaw member 20 is welded as at 21. This jaw member 20 consists of a solid rod and is provided with a stud 22 extending laterally thereof with its axis at substantially right angles to the plane of the weblike arm 18. By this arrangement a very rigid and firm mounting and good support along a substantial length of the jaw member is provided.

This unit 16 is positioned over the upper end of the post 14 along which it may slide until it rests upon some suitable spacer 23 which has previously been positioned on the post. This spacer may vary with the different work in hand, but is so positioned as to height that it will support the jaw in close proximity to its working position in a position readily available for further use. Above this unit 16 I provide a washer 24 for enlarging the bearing portion of the end of the sleeve upon which a spring 25 rests, the upper abutment for the spring being provided by another washer 26. A collar 27, from which a stud 28 projects, is rotatably mounted upon the post between washer 26 and another washer 29 which is held in place by a pin 30 passing through a hole in the post. This spring forces the collar 27 upwardly against the abutment 29 and also forces the sleeve or unit 16 downwardly along the post 14.

A lever 32 having a handle portion 33 is fulcrumed on the post 28 and is held in position thereon by a pin 34 while the load is applied on this lever by reason of an opening in the lever for the reception of the stud 22 of the jaw member which is held in position thereon by a pin 35.

The work consists of channel portions 36 and 37 which are to be secured in the definite relationship shown by welding a plate 38 thereto. This plate must be held firmly in engagement with the parts 36 and 37 in order that the weld may be provided, these parts being mounted upon the portion 11 of the jig 10 previously described. At the time of positioning the work the jaw unit 16 will be swung about the post as at A in Fig. 3. The operator will lift the handle 33 upwardly as indicated in the dot-dash line, which in turn will lift the jaw member 20 by sliding the sleeve upwardly along the post and compressing the spring. When in raised position the jaw member may then be swivelled about the post until it is directly above the plate 38 which is to be welded. The jaw member will then be lowered by lowering the handle until it comes in engagement with the plate whereupon the spring will apply its full force upon the unit 16 moving the member 20 firmly into engagement with the plate 38 and the plate into engagement with the part 36 and 37 to which it is to be welded. If the operator desires to strike a hammer action on the plate 38 after he has moved the jaw member 20 above the plate he may suddenly let go of the handle 33 allowing the full force of the very strong spring to force the unit 16 downwardly with the result that the jaw member 20 will strike a hammer blow on the plate 38 to drive it into position.

During welding, if it is desired, the welder may move the clamping jaw about on the plate 38 to afford him more access to the point he desires to weld, or to secure pressure in the more desired location. After welding has been finished the handle 33 may again be engaged and lifted to lift the jaw upwardly, and then the handle may be swung to swivel the entire unit 16 about the post to a position which leaves the work clear to be removed from the jig.

I claim:

1. A work clamp comprising a rigid post, a jaw member, an arm carrying said jaw member, means to swivelly mount said arm on said post, a spring urging said means along said post in the direction of the longitudinal axis of said post, a pivot swivelly mounted on said post, and a lever swivelly mounted on said pivot and acting on said member for moving said member against the action of said spring.

2. A work clamp comprising a rigid post, a jaw member, an arm carrying said jaw member, means to swivelly mount said arm on said post, a spring urging said means along said post, a collar on the post above the spring, provided with a stud, and a lever pivoted on said stud and engaging a part carried by said member for moving the member against the action of said spring.

3. A welding clamp comprising a rigid post, a sleeve slidable along and rotatable about said post, an arm secured to said sleeve and comprising a web of material extending laterally of the axis of said sleeve, a jaw member secured to the other end of said arm, an abutment on said post, a spring encircling said post, and acting between said abutment and said sleeve to move the sleeve along said rod, and a lever pivoted on said post and engaging said jaw member to move the jaw against the action of said spring.

4. A welding clamp comprising a rigid post, a sleeve slidable along and rotatable about said post, an arm secured to said sleeve and comprising a web material extending laterally of the axis of said sleeve, a jaw member secured to the other end of said arm, an abutment on said post, a collar provided with a stud, a spring encircling said post urging said collar against said abutment, and acting between said collar and said sleeve to move the sleeve along said rod, and a lever pivoted on said stud and engaging a part carried by said jaw member to move the jaw against the action of said spring.

GERICHO BROSCO.